United States Patent [19]

Baker

[11] 4,083,328
[45] Apr. 11, 1978

[54] PORTABLE PET WASHING DEVICE

[75] Inventor: Sandra Baker, New York, N.Y.

[73] Assignee: The Raymond Lee Organization, Inc., New York, N.Y. ; a part interest

[21] Appl. No.: 740,549

[22] Filed: Nov. 10, 1976

[51] Int. Cl.² .............................................. A01K 13/00
[52] U.S. Cl. .................................................. 119/158
[58] Field of Search .................... 119/158, 159, 160, 1, 119/156

[56] References Cited

U.S. PATENT DOCUMENTS

| | | | |
|---|---|---|---|
| 1,760,017 | 5/1930 | Smoot | 119/1 |
| 3,749,064 | 7/1973 | Weinstein et al. | 119/158 |

Primary Examiner—Hugh R. Chamblee
Attorney, Agent, or Firm—Daniel Jay Tick

[57] ABSTRACT

A rigid tub has an outlet hose affixed to the bottom thereof extending from an outlet hole for draining the tub. An outlet cap on the outlet hose manually controls the flow of fluid through the hose. A flexible bag has a body opening and a head opening formed therethrough and a zipper extending along the body opening to the head opening for selectively opening and closing the body opening to position a pet therein with its head extending beyond the bag through the head opening. A first fastening device releasably affixes the bag to the tub in a manner whereby the bag covers the tub and extends a distance thereabove. An inlet in the bag admits solids and fluids into the bag onto a pet in the tub. A pair of spaced hand holes are formed through the bag. Each of a pair of sleeves extends from the bag at a corresponding one of the hand holes for accommodating the arms of a user washing a pet in the tub.

1 Claim, 4 Drawing Figures

PORTABLE PET WASHING DEVICE

BACKGROUND OF THE INVENTION

The present invention relates to a portable pet washing device. More particularly, the invention relates to a portable pet washing device for washing a pet without wetting the area in which the device is positioned.

Objects of the invention are to provide a portable pet washing device of simple structure, which is inexpensive in manufacture, light in weight, portable with complete facility and convenience, stored with facility and convenience in a minimal space, used with facility and convenience, and functions efficiently, effectively and reliably to permit a complete washing of a pet of any size, such as, for example, a large dog, indoors without wetting, splattering, or otherwise disturbing the neatness of, the area.

BRIEF DESCRIPTION OF THE DRAWINGS

In order that the invention may be readily carried into effect, it will now be described with reference to the accompanying drawings, wherein.

DETAILED DESCRIPTION OF THE INVENTION

The portable pet washing device of the invention is for washing a pet without wetting the area in which the device is positioned.

Figure 1:
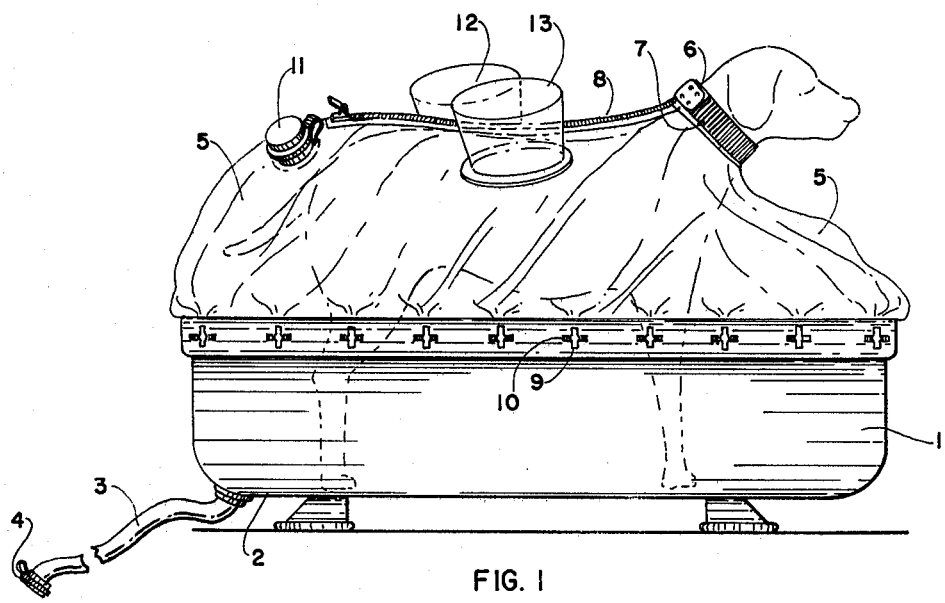
FIG. 1 is a view of an embodiment of the portable pet washing device of the invention accommodating a pet.

The portable washer device of the invention comprises a substantially rigid tub 1 of plastic material of any suitable type having an outlet hole (not shown in the FIGS.) formed through the bottom 2 of said tub (FIG. 1). An outlet hose 3 is affixed to the bottom 2 of the tub 1 and extends from the outlet hole for draining the tub 1. An outlet cap 4 (FIG. 1) is provided on the outlet hose 3 for manually controlling the flow of fluid through said hose. In other words, as is obvious, if the cap 4 is open, fluid will drain from the tub 1. If the cap 4 is closed, fluid in the tub will remain therein.

Figure 4:
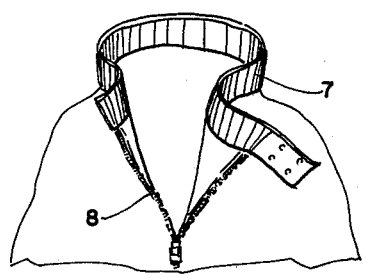
FIG. 4 is a view of part of the zipper and the head opening of the flexible bag of the portable pet washing device of the invention.

A substantially flexible plastic bag 5 (FIG. 1) has a body opening and a head opening 6 formed therethrough. The head opening 6 is surrounded by a collar-type device 7 (FIGS. 1 and 4). A plastic zipper device 8 (FIGS. 1 and 4) extends along the body opening to the head opening 6 for selectively opening and closing the body opening to position a pet therein with its head extending beyond the bag 5 through the head opening 6, as shown in FIG. 1.

A plurality of fastening devices releasably affix the bag 5 to the tub 1 in a manner whereby the bag covers the tub and extends a distance above said tub, as shown in FIG. 1. Each of the fastening devices comprises an arm 9 pivotally affixed to the bag 5 in spaced relation with the other similar arms. A plurality of spaced slots such as, for example, the slot 10, are formed through the upper rim of the tub 1 for accommodating the arms 9. When the bag 5 is positioned in the tub 1, each of the arms 9 is moved from the inside of the tub through a corresponding one of the slots and is then manually rotated approximately 90° thereby securing the bag in position in the tub.

Figure 2:
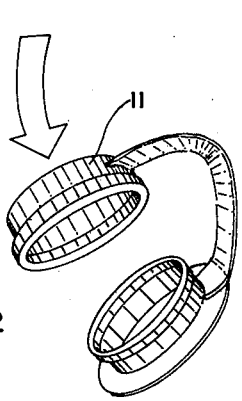
FIG. 2 is a perspective view, on an enlarged scale, of an embodiment of the inlet device of the portable pet washing device of the invention.
Figure 3:
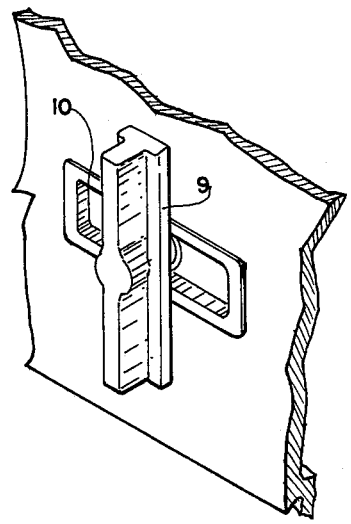
FIG. 3 is a perspective view, on an enlarged scale, of a fastener of the portable pet washing device of the invention.

An inlet hole (not shown in the FIGS.) is formed through the bag 5 for admitting solids and fluids into the bag onto a pet in the tub 1. A cap 11 (FIGS. 1 and 2) is affixed to the bag 5 for selectively covering and uncovering the inlet hole through said bag.

A pair of spaced hand holes (not shown in the FIGS.) are formed through the bag 5. A pair of flexible plastic sleeves 12 and 13 (FIG. 1) extend from the bag at each of the hand holes, respectively, for accommodating the arms of a user washing a pet in the tub.

While the invention has been described by means of a specific example and in a specific embodiment, I do not wish to be limited thereto, for obvious modifications will occur to those skilled in the art without departing from the spirit and scope of the invention.

I claim:

1. A portable pet washing device for washing a pet without wetting the area in which the device is positioned, said pet washing device comprising
   a substantially rigid tub of plastic material having an outlet hole formed through the bottom thereof;
   an outlet hose affixed to the bottom of the tub and extending from the outlet hole for draining the tub;
   outlet cap means on the outlet hose for manually controlling the flow of fluid through said hose;
   a substantially flexible plastic bag having a body opening and a head opening formed therethrough and zipper means extending along the body opening to the head opening for selectively opening and closing the body opening to position a pet therein with its head extending beyond the bag through the head opening;
   fastening means for releasably affixing the bag to the tub in a manner whereby the bag covers the tub and extends a distance above said tub;
   inlet means in the bag for admitting solids and fluids into the bag onto a pet in the tub, said inlet means comprising an inlet hole formed through the bag and a cap affixed to the bag for selectively covering and uncovering the inlet hole;
   a pair of spaced hand holes formed through the bag; and
   a pair of plastic sleeve means each extending from the bag at a corresponding one of the hand holes for accommodating the arms of a user washing a pet in the tub.

* * * * *